3,702,841
INTUMESCENT PAINT CONTAINING
NITRILE RUBBER
Paul M. Sawko, San Jose, Calif., assignor to the United States of America as represented by the Administrator of the National Aeronautics and Space Administration
No Drawing. Filed Feb. 12, 1971, Ser. No. 115,082
Int. Cl. C08d 9/10, 13/10; C08g 37/18
U.S. Cl. 260—2.5 F                    4 Claims

ABSTRACT OF THE DISCLOSURE

An intumescent agent is provided which contains para-nitroaniline-bisulfate dispersed in a mixture of an acrylonitrile-butadiene copolymer and a phenolic resin. The adhesion and water resistance are both greater than intumescent agents known in the past.

The invention described herein was made by an employee of the United States Government and may be manufactured and used by or for the Government for Governmental purposes without the payment of any royalties thereon or therefor.

BACKGROUND OF THE INVENTION

Field of the invention

Intumescent agent applied as a paint or the like to protect material from fire or heat damage.

Description of the prior art

A number of different intumescent coatings have been suggested in the prior art. One consists of paranitroaniline-bisulfate dispersed in a nitrocellulose vehicle (U.S. Pat. 3,535,130) which provides a highly effective type of intumescent coating. Such coatings intumesce or decompose at about 200 to 250° C. to form a voluminous char several hundred times the original coating thickness. Although such coatings are effective for many purposes the use of a highly flammable, potentially explosive cellulose nitrate solution in the manufacture of such coatings is undesirable. Further, the intumescence is so effective, i.e. the volume increase is so great, that there is erratic adhesion of the coating after it has expanded. This limits it to uses where it can be confined. Vertical surfaces, ceilings and round configurations cannot ordinarily be protected and the impact resistance is not as great as might be desired. Further, such coatings are very sensitive to additives, modifiers and plasticizers which makes the compounding of such materials somewhat critical.

Other types of intumescent coatings which have been suggested are very water sensitive. For instance, one type uses a phosphate catalyst which decomposes to phosphoric acid and ammonia which then reacts with a carbonific or char-forming material which is held in place with a resinous binder. Such coatings are extremely critical in their composition and are not stable in the presence of water or even a moist atmosphere, reducing their effectiveness.

SUMMARY OF THE INVENTION

According to the present invention it has been found that highly effective intumescent agents can be formulated combining a powdery salt of para-nitroaniline-bisulfate by dispersing the salt in a nitrile rubber-phenolic resin combination. Such a combination gives a highly effective intumescent agent which expands upon heating and forms a tough, adherent heat insulator type of char foam, thus providing a degree of protection against heat, fire and the like. The formulation has a number of advantages over those heretofore known. In the first place, instead of employing the highly inflammable cellulose nitrate, relatively non-inflammable materials are employed, particularly a rubber and a phenolic resin.

Secondly, the formulation is not critical, so that the amount of the para-nitroaniline-bisulfate can be varied over a wide range without loss of effectiveness.

Another advantage of the present invention is that it gives good adhesion even on hot surfaces so that it is completely feasible to use the coating composition on ceilings, vertical surfaces and the like where many compositions of the prior art were entirely unsuited.

Still another advantage of the compositions of the present invention, particularly over intumescent agents of the phosphate type, is that they are moisture resistant so that they do not lose their intumescent qualities even upon prolonged exposure to rain or moist atmospheres.

DESCRIPTION OF THE PREFERRED EMBODIMENTS

In compounding the intumescent agents of the present invention it is only necessary to form a stable dispersion the para-nitroaniline bisulfate-together with the rubber-resin combination. The amount of the sulfate can vary, on a dry weight basis, from 20 to 80 percent of the overall composition. The preparation of the sulfate is described in U.S. Pat. 3,535,130, and will therefore not be described in detail.

Suitable nitrile-butadiene rubbers are well known to those skilled in the art and are available commercially. These have a nitrile content of 22 to 50 percent and typical examples are sold under the trade names of Hycar 1001, Hycar 1002, Hycar 1014, Hycar 1000X132 and Hycar 1000X88 by the B. F. Goodrich Company. These are known as low, medium-high, high and very high acrylonitrile rubbers. Phenolic resins have unlimited compatibility with such rubbers.

The phenolic resin is a finely powdered thermo-setting solid which becomes fluid when heated to about 80° C. The phenolic resin is a mass condensation polymer of phenols and aldehydes. One particularly suitable phenolic resin is sold under the trade name Durez 12687 by the Hooker Chemical Co.

These specific rubbers and resins are given merely as examples of many suitable commercially available resins and rubbers.

In compounding the rubber and the phenolic resin, from 30% to 70% by weight of the rubber can be used with from 70% to 30% of the phenolic resin. Compounding methods are well known to those skilled in the art and, for instance, are set forth in detail in Service Bulletin No. 300 of the Hooker Chemical Company entitled "Durez Resins."

In addition, blends of nitrile rubber and phenol resin are also available commercially so that it is not necessary to procure separate ingredients. For instance, materials sold as Plastilock 605-4 and A-642B by the B. F. Goodrich Company are typical of suitable rubber-phenolic resin combinations. Such formulations generally contain from 25-41% solids (rubber-phenolic), are usually dispersed in methyl ethyl ketone, and have a viscosity ranging from 4-35,000 cps.

The resin blend is prepared with the appropriate solvent, filler, and vulcanizing agents. Such highly polar solvents as ketones, nitroparafins, chlorinated aromatics, and acetates give the best results. The vulcanizing agents generally acceptable include such compounds as zinc oxide, sulfur, benzothiazyl disulfide, tetramethylthiuram disulfide, and tetramethylthiuram monosulfide. In addition the paint may contain a finely divided, solid reinforcement material. A typical filler for reinforcement in a furnace (carbon) black pigment.

The compositions of the present invention are applied to substrates such as steel, aluminum, or wood by spraying or other conventional means. The compositions air dry overnight to tough adherent coatings. The coatings when exposed to heat or flame intumesce or swell at a controlled rate to about 20 to 40 times original thickness providing a tough, adherent char capable of providing short term insulation of substrates from heat and fire. The temperature of intumescence occurs at about 200 to 250° C.

The following non-limiting examples illustrate various preferred embodiments of the invention:

EXAMPLE 1

A quality of 11.5 parts by weight of a commercial nitrile rubber-phenolic resin, 44 parts of para-nitroaniline-bisulfate and 44.5 parts of methyl ethyl ketone was mixed together in a pebble mill to produce a dispersion of 3+ on the Hegman scale. The nitrile rubberphenolic resin was Plastilock 605–4. A stable paint was obtained having a wet film density of about 1. It could be brushed, sprayed or rolled onto a dry surface such as wood, aluminum, steel, asbestos and paper. The paint provided good adhesion without the use of a primer and the film was flexible. The paint intumesced uniformly when heated. For example, a 0.020-inch thick film of dry paint intumesced to a thickness of ¼ to ½ inch. The thickened film had good adhesion even on ceilings.

EXAMPLE 2

Another composition consisted of 6.3 parts by weight of the high acrylonitrile rubber available as Hycar 1001 from B. F. Goodrich Company dissolved with 30.1 parts by weight of methyl ethyl ketone. To this solution was added the phenolic resin available as Durez 12687 from Hooker Chemical Co. at 1.9 parts by weight. The various accelerators, fillers, and vulcanizing agents were added at the following parts by weight: 0.2 of sulfur, 0.2 of benzothiazyl disulfide (available as Altax from R. T. Vanderbilt Co.), 0.6 of zinc oxide, and 1.3 of carbon black filter (availble as Sterling S from Godfrey L. Cabot, Inc.). To this nitrile-phenolic rubber composition was added 44 parts by weight of para-nitroaniline-bisulfate and 14.5 parts by weight of cyclohexanone. The mixture was dispersed in a pebble mill or sand mill until a dispersion of 3+ on the Hegman scale was otained. A stable coating composition was obtained having a wet film density of about 1.0.

The coating composition was sprayed on cold rolled steel substrate at 30 mils dry film thickness and air dried overnight to a tough, adherent coating. The dry coating had a density of about 1.3 g./cc. and an abrasion resistance of 105± 10 milligram weight loss per 1000 cycles using a Taber Abraser Model 503. The linear expansion or intumescence was determined to be a minimum of 30 times the original thickness when heated in a preheated oven to 350° C. for 30 minutes.

The thermal protection or efficiency of the coating composition was also determined. A heating rate of 10 to 11 Btu./ft.$^2$-sec. was applied to special 3-inch by 3-inch by ⅟₁₆-inch cold rolled steel substrates having 1-inch diameter holes in the center which had a 1⁵⁄₁₆-inch diameter cold rolled steel disc cemented in place. These special plates had attached to the surface various (30, 60, 90) mils of the coating. The heat was obtained by the combustion of JP-4 fuel fire impinging on the coating surface during the thermal test. The time-temperature history was measured by the thermocouple attached to the backface of the specimen. Times to reach a backface temperature of 200° C. of 1½ to 5 minutes have been recorded depending on the initial thickness. In addition, a tough, aherent, intumesced char was formed during this thermal activation of the coating.

EXAMPLE 3

A composition similar to Example 2 was prepared except that the carbon black filler was omitted.

EXAMPLE 4

A paint was prepared which was the same as Example 2 except for the following amounts of material:

12.3 parts by weight bisulfate salt (dry weight basis)
10.0 parts by weight methyl ethyl ketone
4.5 parts by weight cyclohexanone

EXAMPLE 5

A paint was prepared which was the same as Example 2 except for the following amounts of materials:

5.0 parts by weight of total polymer weight of Hycar 1000X88
5.5 parts by weight of salt (dry weight basis)
Same solvent as Example 4

EXAMPLE 6

A paint was prepared which was the same as Example 2 except for the following amounts of materials:

2.1 parts by weight salt (dry weight basis)
Same solvent as Example 4

EXAMPLE 7

A paint was prepared which was similar to Example 2 except for the following:

4.1 parts by weight of polymer of Hycar 1001
4.1 parts by weight of polymer of Durez 12687
0.4 parts by weight ZnO (dry weight basis)

EXAMPLE 8

A paint was prepared which was similar to Example 2 except for the following:

2.5 parts by weight of polymer of Hycar 1022 (med. high acrylonitrile rubber)
5.7 parts by weight Durez 12707

The coatings of these examples all performed in a manner comparable to the coating of Example 2.

I claim:

1. An intumescent paint containing, on a dry weight basis, from 20 to 80 percent of para-nitroaniline bisulfate and the balance of said composition consisting essentially of an acrylonitrile-butadiene rubber and a thermosetting phenolic aldehyde resin, said mixture containing essentially from 30–70% by weight of acrylonitrile rubber and from 70 to 30% by weight of phenolic aldehyde resin.

2. The paint of claim 1 wherein the acrylonitrile-butadiene rubber contains from 22% to 50% by weight of acrylonitrile.

3. The paint of claim 1 wherein the phenolic resin is a condensation polymer of phenols and aldehydes which becomes fluid when heated to about 80° C.

4. The paint of claim 1 which contains a finely divided, solid filler,

References Cited

UNITED STATES PATENTS

| | | | |
|---|---|---|---|
| 3,535,130 | 10/1970 | Webb et al. | 117—136 |
| 3,336,153 | 8/1967 | Juda | 117—136 |
| 2,459,739 | 1/1949 | Groten et al. | 260—2.5 |

JOHN C. BLEUTGE, Primary Examiner

U.S. Cl. X.R.

117—136; 260—2.5 FP, 845